April 9, 1957 R. B. BEARD 2,787,903
MEASURING APPARATUS
Filed June 29, 1953
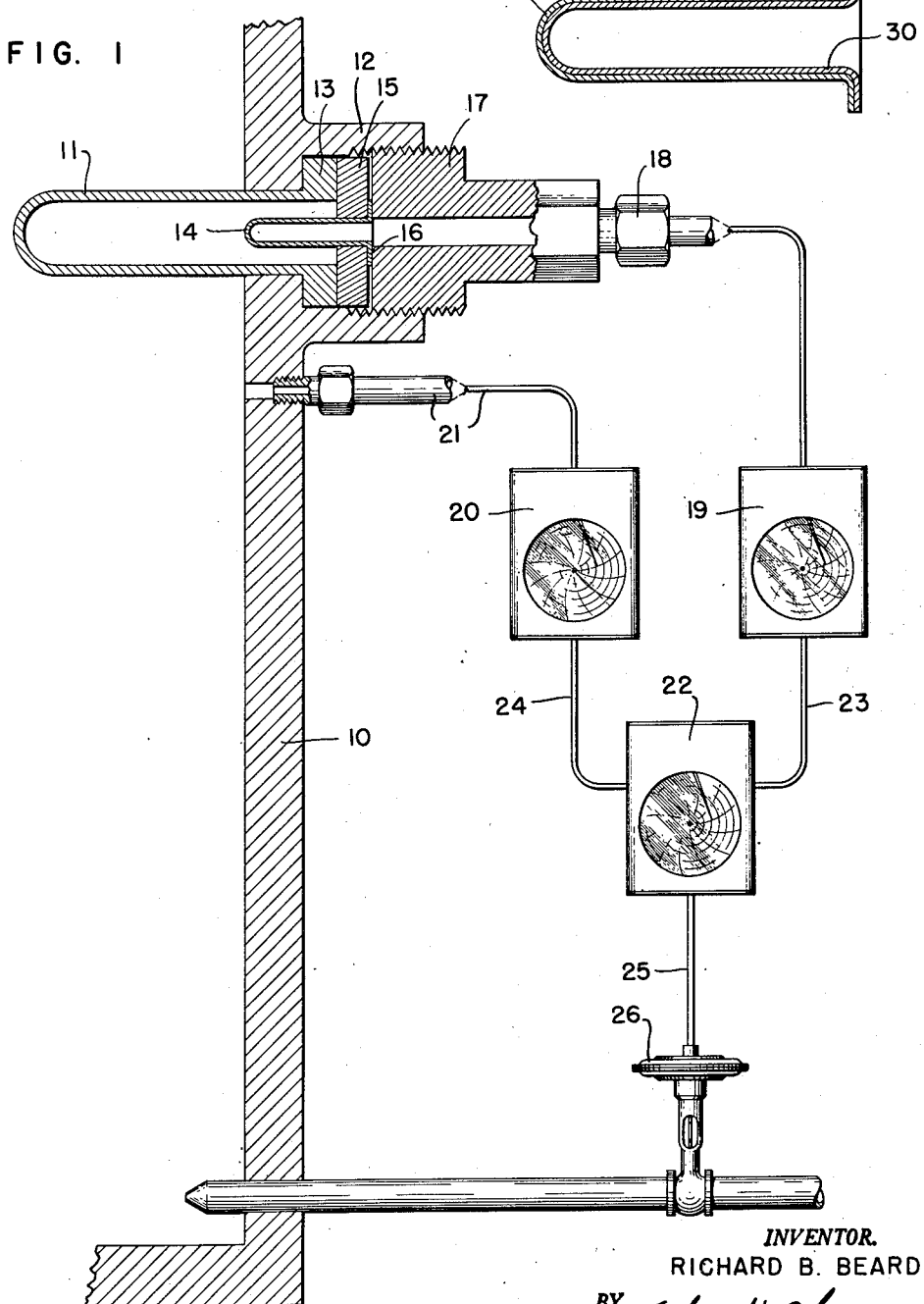
INVENTOR.
RICHARD B. BEARD
BY Arthur H. Swanson
ATTORNEY.

United States Patent Office 2,787,903
Patented Apr. 9, 1957

2,787,903

MEASURING APPARATUS

Richard B. Beard, Philadelphia, Pa., assignor to Minneapolis-Honeywell Regulator Company, Minneapolis, Minn., a corporation of Delaware Application June 29, 1953, Serial No. 364,713

8 Claims. (Cl. 73—23)

A general object of the present invention is to provide an atmospheric analyzing apparatus utilizing a plurality of diffusion elements of selective permeability to components of the atmosphere. More specifically, the present invention is concerned with apparatus for measuring the partial pressure of a gas of a gaseous atmosphere containing corrosive gases which would normally destroy the selective permeability of the partial pressure sensing apparatus used in the apparatus.

There are many instances, particularly combustion process analysis, where it is desirable to know the constituents or components of a gas atmosphere. This atmosphere may be in a heat treating furnace, a combustion system, or the like. In order that improved combustion process operation be attained, the accurate indication of certain of the components must be known so that appropriate corrective action may be made either to emphasize or eliminate the presence of certain constituents. Thus, in heat treating furnaces, the presence of oxygen is objectionable because the oxygen will form oxides on the surface of the metal being treated. It is therefore essential that there be available some sensing element which will detect the presence of oxygen as well as the partial pressure of the oxygen. Similarly, a combustion process of a boiler, or the like, may be burning with too much oxygen so that as a result the maximum heat is not obtained from the fuel. Observation of the combustion gases leaving a combustion device may serve as an indication of the need to apply corrective action.

It has been observed that certain elements have a high selective permeability to certain gases. Thus, elements having this selective permeability may be used for isolating by absorption on the surface, diffusion through, and deabsorption from the element, certain gases from other gases. It is known that silver has a high selective permeability for oxygen. Further, it is known that palladium has a high selective permeability for hydrogen. Other materials and metals have different permeability characteristics. In observing oxygen in a combustion process, the direct positioning of a pressure sensing means, such as a silver element, directly in the combustion process will not give satisfactory results because many combustion processes contain sulphurous gases which will react with the silver and destroy the selective permeability of the same. It is therefore desirable to provide some means for isolating the oxygen sensing element from the corrosive aspects of the atmosphere being examined. This may be accomplished by placing a protective element ahead of the selected partial pressure measuring element which will pass all but the undesirable gas or gaseous element to isolate certain of the gases of the atmosphere from the final sensing element.

It is therefore a more specific object of the present invention to provide an improved partial pressure sensing element for an atmosphere which sensing element has a protective element ahead of the final sensing element to isolate corrosive gases from the final sensing element.

A still more specific object of the present invention is to provide an improved oxygen partial pressure sensing element comprising a silver tube which is highly selective in its permeability to oxygen with a further isolating protective element positioned between the corrosive gases of the atmosphere and the silver tube with the protective element passing oxygen but not the corrosive atmosphere.

Still another object of the present invention is to provide an improved apparatus for determining the ratio of partial oxygen pressure to total atmospheric pressure so that a percentage of the oxygen in the total atmosphere may be determined.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Of the drawings:

Fig. 1 represents a diagrammatic showing of a preferred embodiment of the invention; and Fig. 2 shows a modified element.

Referring first to Fig. 1, the numeral 10 represents the wall of a chamber, such as a furnace or exhaust conduit of a furnace. Projecting through the furnace wall into the area wherein the atmosphere to be examined is located is an element 11. This element is formed of a material with a selective permeability which will prevent certain corrosive gases within the chamber from diffusing therethrough. This tube may be, for example, a tube of nickel or steel wherein the steel has a carbon content of 0.6 percent or greater. The nickel and steel will not permit sulphurous gases to pass therethrough although the element will pass such gases as oxygen, hydrogen, carbon monoxide, carbon dioxide, or steam. This element 11 is mounted in the wall by a suitable bracket 12 which bracket engages a shoulder 13 on the end of the tube 11.

Positioned within the tube 11 is a second tube 14 which tube has a high selective permeability to the particular gas which is being measured. Thus, in the case of oxygen, the tube 14 will preferably be made of silver or appropriate silver alloys which will readily permeate oxygen therethrough but which will not pass the other gases which have passed through tube 11.

The tube 14 is maintained in position by a washer 15 which bears against the shoulder 13 and has projecting therethrough the tube 14 with the outer end of the tube 14 having shoulders formed thereon as at 16. The tube 14 is in turn maintained in position by an element 17 which also threadedly engages the mounting bracket 12. The element 17 has an opening extending therethrough and is arranged for connection by a connector 18 to a suitable conduit so that the partial pressure may be fed through the conduit to a partial pressure indicating instrument 19.

In order to determine the ratio between partial pressure and total pressure, an instrument 20 is provided for indicating the total pressure within the chamber where the gases are being determined. The instrument 20 is connected directly to the chamber by means of a conduit 21. Both of the instruments 19 and 20 are capable of producing output pressures which are proportional to the input pressures applied thereto. These output pressures are applied to a suitable ratio measuring instrument 22 by way of the conduits 23 and 24. The instruments 19 and 20 may well take the form of the apparatus shown in the Burdick patent, 2,548,943, issued April 17, 1951. The ratio and indicating apparatus 22 may well take the form of the Burdick patent, 2,410,335, issued October 29, 1946.

While reference is made to specific apparatus it will be understood that other types of indicators and ratio measuring apparatus may be employed.

The operation of the apparatus will be understood when it is first noted that the element 11 will permeate therethrough oxygen but will exclude gases of the sulphurous type. The oxygen inside of the tube 11 will in turn be permeated through the silver tube 14 with the pressure in conduit 18 being the partial pressure of the oxygen present in the atmosphere under observation. This partial pressure is fed to the instrument 19 which will make an appropriate record thereof and also produce an output pressure for the instrument 22. The total pressure which was in the chamber will be detected by the pressure instrument 20 which will likewise produce an output control pressure proportional to the total pressure and this pressure is in turn fed to the instrument 22. As the instrument 22 is a ratio measuring apparatus, the indication on the apparatus will be in terms of the ratio of partial to total pressure. This ratio may be expressed in terms of a percentage. The instrument 22 may also be used to accomplish some control action and for this purpose an output conduit 25 carrying a pressure proportional to the ratio of partial to total pressure will act upon a valve 26. The valve 26 may in turn be used to regulate the flow of a material into the chamber so as to vary the constituents of the atmosphere.

It will be noted that the primary sensing element 14 is located at a point somewhat remote from the outer end of the tube 11. This construction is necessary under circumstances where the element 11 projects into an atmosphere having a very high temperature. As silver has a relatively low melting point, compared to nickel or steel, it is desirable that the silver element 14 be positioned at a point which is somewhat cooler than the element 11. By observing the pressures in the furnace at the same point, the need for temperature compensation is eliminated. Such compensation may be required where the pressure take off points are of widely different compensations. This may be accomplished by thermocouple or resistance means operating through an appropriate indicator and controller which may be used to modify the output pressure of the instrument 19 in accordance with the temperature difference by means, not shown, but which are well known in the art.

Fig. 2 shows one manner in which the apparatus of Fig. 1 may be modified. Here a silver tube 30 is formed in any suitable manner on the interior of a protective tube 31. This latter tube may be formed of nickel or steel, as mentioned above. The function of the two elements is the same as above except that the temperature of the silver tube 30 will be the same as the protective tube 31. This arrangement is limited in the temperature range where it may be operated.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. Apparatus for detecting the partial pressure of oxygen in an atmosphere containing sulphurous components, comprising a first enclosed chamber having as a gaseous inlet a first gaseous permeating element which will pass oxygen and exclude the sulphurous gases, said chamber being arranged for extension into the atmosphere, a second enclosed chamber positioned within said first chamber and having a gaseous inlet formed of a silver element which has a high selective permeability to oxygen, and coupling means arranged for connecting said second chamber to a pressure measuring apparatus for determining the oxygen partial pressure in said second chamber.

2. Apparatus as defined in claim 1 wherein said first gaseous permeating element is formed of nickel.

3. Apparatus as defined in claim 1 wherein said first gaseous permeating element is formed of steel having a carbon content of greater than 0.6 percent.

4. Apparatus for measuring the partial pressure of oxygen in an atmosphere containing oxygen and other gases some of which are corrosive in nature comprising a first hollow enclosure having a gas permeable element as a part of the enclosure arranged for extension into the atmosphere, said permeable element passing into said enclosure certain preselected gases including oxygen and excluding from the enclosure sulphurous gases, a second hollow enclosure mounted within said first enclosure, said second enclosure having an oxygen permeable member which would react with the corrosive gases positioned to form a part of the wall of the second enclosure and passing only oxygen into said second enclosure, and a pressure sensing connection on said second enclosure.

5. Apparatus for measuring the partial pressure of a gaseous component in a given atmosphere comprising, a first element having a selective permeability which will allow only the selected gaseous component to pass, said first element forming an opening to an otherwise sealed chamber which opening will pass the gaseous component and establish a partial pressure of the gaseous component in said chamber which partial pressure is representative of the partial pressure of the selected component in the atmosphere, a second element having a selective permeability for a number of gases including said one gaseous component interposed between the atmosphere and said first element so that the atmospheric gases must first pass through said second element before said one gaseous component will pass through said first element, said second element forming a barrier to exclude gases including sulphurous gases which would react with said first element, and coupling means arranged for passing the pressure of said one gaseous component in said chamber to a pressure measuring instrument.

6. Apparatus for detecting the partial pressure of oxygen in a given atmosphere comprising, a sealed chamber having as a gaseous inlet a silver element whose permeability to oxygen is high, and enclosing means surrounding said sealed chamber and having as a gaseous inlet a second element having a preselected high permeability to a number of components of said atmosphere including oxygen and forming a barrier for sulphurous gaseous components which would react with said silver element, said second element having mounting means for extending said element into the atmosphere, and connecting means arranged for connecting said first chamber to a pressure measuring means.

7. Apparatus for detecting the partial pressure of oxygen in a given atmosphere comprising, a first enclosed chamber having as a gaseous inlet a silver element whose permeability to oxygen is high, a second chamber having as a gaseous inlet a second element having a high permeability to a number of components of said atmosphere including oxygen, and having negligible permeability to sulphurous gaseous components which would react with said silver element, said second element being directly exposed to the atmosphere, means connecting said first chamber to a pressure measuring means, means responsive to the total pressure of the atmosphere, and pressure measuring means connected to said first chamber for determining a ratio of oxygen pressure in said first chamber to total atmospheric pressure.

8. Apparatus for detecting the partial pressure of oxygen in a heated atmosphere containing sulphurous gases comprising, a first closed tube arranged to be mounted for extension into the heated atmosphere, said tube having a permeability which will exclude the sulphurous gases and pass oxygen, an enclosure, an element defining a gaseous inlet to said enclosure and having a high selective permeability to oxygen so that the partial pressure of the oxygen in the atmosphere would appear in said enclosure, said element and said enclosure being positioned inside of said first tube at a point where the temperature thereof is less than the temperature of the atmosphere, and means for connecting said enclosure to pressure measuring means.

References Cited in the file of this patent

UNITED STATES PATENTS

| | | |
|---|---|---|
| 1,174,631 | Snelling | Mar. 7, 1916 |
| 2,293,019 | Johnson | Aug. 11, 1942 |
| 2,456,163 | Watson | Dec. 14, 1948 |

OTHER REFERENCES

Metals Reference Book, C. G. Smithells published Interscience Publishers, Inc., New York, 1949, page 388.